United States Patent
Soskind et al.

(10) Patent No.: US 11,754,767 B1
(45) Date of Patent: Sep. 12, 2023

(54) DISPLAY WITH OVERLAID WAVEGUIDE

(71) Applicant: Apple Inc., Cupertino, CA (US)

(72) Inventors: Yakov G. Soskind, Plainsboro, NJ (US); Alexander Shpunt, Portola Valley, CA (US); Graham C. Townsend, Menlo Park, CA (US)

(73) Assignee: APPLE INC., Cupertino, CA (US)

( * ) Notice: Subject to any disclaimer, the term of this patent is extended or adjusted under 35 U.S.C. 154(b) by 270 days.

(21) Appl. No.: 17/151,170

(22) Filed: Jan. 17, 2021

Related U.S. Application Data (60) Provisional application No. 62/985,354, filed on Mar. 5, 2020.

(51) Int. Cl.
| | |
|---|---|
| *F21V 8/00* | (2006.01) |
| *G02B 6/35* | (2006.01) |
| *G02B 27/00* | (2006.01) |
| *H04N 13/332* | (2018.01) |

(52) U.S. Cl.
CPC ............. *G02B 6/0016* (2013.01); *G02B 6/35* (2013.01); *G02B 27/0093* (2013.01); *H04N 13/332* (2018.05); *H04N 2213/001* (2013.01)

(58) Field of Classification Search
CPC .......... H04N 2213/001; H04N 13/332; G02B 27/0093; G02B 6/35; G02B 6/0016
See application file for complete search history.

(56) References Cited

U.S. PATENT DOCUMENTS

| | | | |
|---|---|---|---|
| 3,796,498 A | 3/1974 | Post | |
| 4,386,827 A | 6/1983 | Scifres et al. | |
| 4,850,673 A | 7/1989 | Velzel et al. | |
| 4,983,825 A | 1/1991 | Ichikawa et al. | |
| 5,067,816 A | 11/1991 | Ichikawa | |
| 5,225,928 A | 7/1993 | Dugan | |
| 5,406,543 A | 4/1995 | Kobayashi et al. | |
| 5,428,445 A | 6/1995 | Holzapfel | |
| 5,477,383 A | 12/1995 | Jain | |
| 5,606,181 A | 2/1997 | Sakuma et al. | |
| 5,621,497 A | 4/1997 | Terasawa et al. | |

(Continued)

FOREIGN PATENT DOCUMENTS

| | | |
|---|---|---|
| CN | 1725042 A | 1/2006 |
| EP | 0670510 A2 | 9/1995 |

(Continued)

OTHER PUBLICATIONS

U.S. Appl. No. 16/428,999 Office Action dated Aug. 26, 2021.

(Continued)

*Primary Examiner* — Mariam Qureshi (74) *Attorney, Agent, or Firm* — KLIGLER & ASSOCIATES PATENT ATTORNEYS LTD (57) ABSTRACT

An optoelectronic device includes a display configured to emit first optical radiation in a first wavelength band through a front surface of the display. A planar optical waveguide, which is transparent in the first wavelength band, is overlaid on the display and is configured to guide second optical radiation in a second wavelength band along a direction transverse to the front surface. One or more diffractive structures are formed in the planar optical waveguide so as to couple the guided second optical radiation between the planar optical waveguide and a region in front of or behind the display.

16 Claims, 6 Drawing Sheets

(56) References Cited

U.S. PATENT DOCUMENTS

| | | |
|---|---|---|
| 5,648,951 A | 7/1997 | Kato et al. |
| 5,652,426 A | 7/1997 | Maeda |
| 5,691,989 A | 11/1997 | Rakuljic et al. |
| 5,703,675 A | 12/1997 | Hirukawa et al. |
| 5,742,262 A | 4/1998 | Tabata et al. |
| 5,781,332 A | 7/1998 | Ogata |
| 5,801,378 A | 9/1998 | Hane et al. |
| 5,812,320 A | 9/1998 | Maeda |
| 6,002,520 A | 12/1999 | Hoch et al. |
| 6,031,611 A | 2/2000 | Rosakis et al. |
| 6,236,773 B1 | 5/2001 | Butler et al. |
| 6,415,083 B1 | 7/2002 | Anderson et al. |
| 6,560,019 B2 | 5/2003 | Nakai |
| 6,583,873 B1 | 6/2003 | Goncharov et al. |
| 6,611,000 B2 | 8/2003 | Tamura et al. |
| 6,707,027 B2 | 3/2004 | Liess et al. |
| 6,927,852 B2 | 8/2005 | Reel |
| 6,940,583 B2 | 9/2005 | Butt et al. |
| 7,112,774 B2 | 9/2006 | Baer |
| 7,112,813 B2 | 9/2006 | Den Boef et al. |
| 7,123,794 B2 | 10/2006 | Greiner et al. |
| 7,227,618 B1 | 6/2007 | Bi |
| 7,304,735 B2 | 12/2007 | Wang et al. |
| 7,335,898 B2 | 2/2008 | Donders et al. |
| 7,433,444 B2 | 10/2008 | Baumann et al. |
| 7,470,892 B2 | 12/2008 | Ohmura et al. |
| 7,492,871 B2 | 2/2009 | Popescu et al. |
| 7,522,698 B2 | 4/2009 | Popescu et al. |
| 7,564,941 B2 | 7/2009 | Baumann et al. |
| 7,700,904 B2 | 4/2010 | Toyoda et al. |
| 7,952,781 B2 | 5/2011 | Weiss et al. |
| 8,530,811 B2 | 9/2013 | Molnar et al. |
| 8,749,796 B2 | 6/2014 | Pesach et al. |
| 8,908,277 B2 | 12/2014 | Pesach et al. |
| 9,036,158 B2 | 5/2015 | Pesach |
| 9,066,087 B2 | 6/2015 | Shpunt |
| 9,098,931 B2 | 8/2015 | Shpunt et al. |
| 9,105,369 B2 | 8/2015 | Koehler |
| 9,131,136 B2 | 9/2015 | Shpunt et al. |
| 9,201,237 B2 | 12/2015 | Chayat et al. |
| 9,222,899 B2 | 12/2015 | Yamaguchi |
| 9,395,176 B2 | 7/2016 | Saendig |
| 9,689,968 B2 | 6/2017 | Zou et al. |
| 9,696,605 B2 | 7/2017 | Russo et al. |
| 9,874,531 B2 | 1/2018 | Yun et al. |
| 9,881,710 B2 | 1/2018 | Roessl et al. |
| 10,634,973 B2 | 4/2020 | Hashemi et al. |
| 10,802,120 B1 | 10/2020 | LaChapelle et al. |
| 10,838,132 B1* | 11/2020 | Calafiore ............ G02B 6/0015 |
| 2004/0012958 A1 | 1/2004 | Hashimoto et al. |
| 2004/0082112 A1 | 4/2004 | Stephens |
| 2004/0184694 A1 | 9/2004 | Ridgway et al. |
| 2005/0178950 A1 | 8/2005 | Yoshida |
| 2006/0001055 A1 | 1/2006 | Ueno et al. |
| 2006/0252167 A1 | 11/2006 | Wang |
| 2006/0252169 A1 | 11/2006 | Ashida |
| 2006/0269896 A1 | 11/2006 | Liu et al. |
| 2007/0007676 A1 | 1/2007 | Sato |
| 2007/0019909 A1 | 1/2007 | Yamauchi et al. |
| 2007/0183560 A1 | 8/2007 | Popescu et al. |
| 2008/0106746 A1 | 5/2008 | Shpunt et al. |
| 2008/0198355 A1 | 8/2008 | Domenicali et al. |
| 2008/0212835 A1 | 9/2008 | Tavor |
| 2008/0240502 A1 | 10/2008 | Freedman et al. |
| 2008/0278572 A1 | 11/2008 | Gharib et al. |
| 2009/0011368 A1 | 1/2009 | Ichihara et al. |
| 2009/0090937 A1 | 4/2009 | Park |
| 2009/0096783 A1 | 4/2009 | Shpunt et al. |
| 2009/0183125 A1 | 7/2009 | Magal et al. |
| 2009/0185274 A1 | 7/2009 | Shpunt |
| 2010/0007717 A1 | 1/2010 | Spektor et al. |
| 2010/0008588 A1 | 1/2010 | Feldkhun et al. |
| 2010/0013860 A1 | 1/2010 | Mandella et al. |
| 2010/0142014 A1 | 6/2010 | Rosen et al. |
| 2010/0278479 A1 | 11/2010 | Bratkovski et al. |
| 2010/0284082 A1 | 11/2010 | Shpunt et al. |
| 2011/0019258 A1 | 1/2011 | Levola |
| 2011/0069389 A1 | 3/2011 | Shpunt |
| 2011/0075259 A1 | 3/2011 | Shpunt |
| 2011/0114857 A1 | 5/2011 | Akerman et al. |
| 2011/0187878 A1 | 8/2011 | Mor et al. |
| 2011/0188054 A1 | 8/2011 | Petronius et al. |
| 2011/0295331 A1 | 12/2011 | Wells et al. |
| 2015/0242056 A1* | 8/2015 | Hoffman ............ G06F 3/0416 |
| | | 345/175 |
| 2016/0161427 A1 | 6/2016 | Butler et al. |
| 2019/0324202 A1 | 10/2019 | Colburn et al. |
| 2019/0391271 A1 | 12/2019 | Goodwill |
| 2020/0033190 A1 | 1/2020 | Popovich et al. |
| 2020/0124474 A1* | 4/2020 | Brueck ............ G01J 3/0262 |
| 2020/0290622 A1 | 9/2020 | Fattal |

FOREIGN PATENT DOCUMENTS

| | | |
|---|---|---|
| JP | 2011118178 A | 6/2011 |
| KR | 102070349 B1 | 1/2020 |
| WO | 2007/043036 A1 | 4/2007 |
| WO | 2007/105205 A2 | 9/2007 |
| WO | 2008/120217 A2 | 10/2008 |
| WO | 2010/004542 A1 | 1/2010 |
| WO | 2012020380 A1 | 2/2012 |
| WO | 2019195174 A1 | 10/2019 |
| WO | 2020002164 A1 | 1/2020 |
| WO | 2020072034 A1 | 4/2020 |

OTHER PUBLICATIONS

Poulton et al., "8192-Element Optical Phased Array with 100° Steering Range and Flip-Chip CMOS," Conference on Lasers and Electro-Optics (CLEO), pp. 1-2, year 2020.

Chung et al., "A Monolithically Integrated Large-Scale Optical Phased Array in Silicon-on-Insulator Cmos", IEEE Journal of Solid-State Circuits, vol. 53, issue 1, pp. 275-296, Jan. 2018.

Miller et al., "Large-Scale Optical Phased Array Using a Low-Power Multi-Pass Silicon Photonic Platform," Optica, vol. 7, No. 1, pp. 3-6, Jan. 2020.

U.S. Appl. No. 16/428,999 Office Action dated Feb. 7, 2022.

Wikipedia, "Talbot Effect," pp. 1-5, last edited Jan. 15, 2022.

Fienup, J.R., "Phase Retrieval Algorithms: a Comparison", Applied Optics, vol. 21, No. 15, pp. 2758-2769, Aug. 1, 1982.

Garcia et al., "Projection of Speckle Patterns for 3D Sensing", Journal of Physics, Conference series 139, pp. 1-7, year 2008.

Garcia et al., "Three-dimensional mapping and range measurement by means of projected speckle patterns", Applied Optics, vol. 47, No. 16, pp. 3032-3040, Jun. 1, 2008.

Gerchberg et al., "A Practical Algorithm for the Determination of the Phase from Image and Diffraction Plane Pictures," Journal Optik, vol. 35, No. 2, pp. 237-246, year 1972.

Sazbon et al., "Qualitative Real-Time Range Extraction for Preplanned Scene Partitioning Using Laser Beam Coding," Pattern Recognition Letters 26, pp. 1772-1781, year 2005.

Moharam et al. "Rigorous coupled-wave analysis of planar-grating diffraction", Journal of the Optical Society of America, vol. 71, No. 6, pp. 811-818, Jul. 1981.

Microvision Inc., "Micro-Electro-Mechanical System (MEMS) Scanning Mirror", p. 1, years 1996-2009.

Eisen et al., "Total internal reflection diffraction grating in conical mounting",Optical Communications 261, pp. 13-18, year 2006.

O'Shea et al., "Diffractive Optics: Design, Fabrication and Test", SPIE Tutorial Texts in Optical Engineering, vol. TT62, pp. 66-72, SPIE Press, USA 2004.

Btendo, "Two Uni-axial Scanning Mirrors Vs One Bi-axial Scanning Mirror", Kfar Saba, Israel, pp. 1-4, Aug. 13, 2008.

Marcia et al., "Fast Disambiguation of Superimposed Images for Increased Field of View", IEEE International Conference on Image Processing, San Diego, USA, pp. 1-4, Oct. 12-15, 2008.

Bradley et al., "Synchronization and Rolling Shutter Compensation for Consumer Video Camera Arrays", IEEE International Workshop on Projector-Camera Systems—PROCAMS 2009, Miami Beach, Florida, pp. 1-8, year 2009.

(56) References Cited

OTHER PUBLICATIONS

Ezconn Czech A.S. "Site Presentation", pp. 1-32, Oct. 2009.
Luxtera Inc., "Luxtera Announces World's First 10GBit CMOS Photonics Platform", Carlsbad, USA, pp. 1-2, Mar. 28, 2005 (press release).
Soskind, "Field Guide to Diffractive Optics," SPIE Press, Bellingham, USA, pp. 51-55, year 2011.
Soskind, "Field Guide to Diffractive Optics," SPIE Press, Bellingham, USA, pp. 56-59, year 2011.
Soskind, U.S. Appl. No. 16/428,999, filed Jun. 2, 2019.
Niu et al., "Development Status of Optical Phased Array Beam Steering Technology," Proceedings of SPIE, vol. 11052, pp. 110521P-1-110521P-7, year 2019.
Rudnick et al., "Sub-GHz Resolution Photonic Spectral Processor and Its System Applications," IEEE Journal of Lightwave Technology, vol. 35, No. 11, pp. 2218-2226, Jun. 2017.
International Application # PCT/US2021/062996 Search Report dated Mar. 25, 2022.

* cited by examiner

DISPLAY WITH OVERLAID WAVEGUIDE

CROSS-REFERENCE TO RELATED APPLICATION

This application claims the benefit of U.S. Provisional Patent Application 62/985,354, filed Mar. 5, 2020, which is incorporated herein by reference.

FIELD OF THE INVENTION

The present invention relates generally to optoelectronic devices, and particularly to displays with associated sources and sensors of optical radiation.

BACKGROUND

Wearable and/or portable consumer devices, such as smartphones, augmented reality (AR) devices, virtual reality (VR) devices, and smart glasses, comprise optical displays, as well as sources and sensors of optical radiation.

SUMMARY

Embodiments of the present invention that are described hereinbelow provide improved display devices and associated methods.

There is therefore provided, in accordance with an embodiment of the invention, an optoelectronic device, including a display configured to emit first optical radiation in a first wavelength band through a front surface of the display. A planar optical waveguide, which is transparent in the first wavelength band, is overlaid on the display and is configured to guide second optical radiation in a second wavelength band along a direction transverse to the front surface. One or more diffractive structures are formed in the planar optical waveguide so as to couple the guided second optical radiation between the planar optical waveguide and a region in front of or behind the display.

In a disclosed embodiment, the first wavelength band is a visible band, while the second wavelength band is an infrared band.

In one embodiment, the planar optical waveguide has a bottom surface in contact with the display and a top surface opposite the bottom surface, and at least one of the one or more diffractive structures is formed in the top surface of the planar optical waveguide. Alternatively or additionally, at least one of the one or more diffractive structures is formed in the bottom surface of the planar optical waveguide.

In some embodiments, the one or more diffractive structures have heights that are smaller than a shortest wavelength in the first wavelength band.

Additionally or alternatively, the one or more diffractive structures are spectrally selective, so as to preferentially diffract the second optical radiation in the second wavelength band. In some embodiments, the one or more diffractive structures are configured to diffract the second optical radiation at different first and second wavelengths in the second wavelength band so as to propagate in the planar optical waveguide at different, respective first and second angles of propagation. In one embodiment, the device includes first and second sensors, which are coupled to detect the second optical radiation propagating through the planar optical waveguide at the first and second wavelengths, respectively.

Further additionally or alternatively, the one or more diffractive structures are angularly selective, so as to preferentially diffract the second optical radiation that is incident on the one or more diffractive structures in a selected angular range. In some embodiments, the one or more diffractive structures are configured to diffract the second optical radiation propagating in different first and second directions in the region in front of or behind the display so as to propagate in the planar optical waveguide at one or more respective angles of propagation. In a disclosed embodiment, the device includes one or more sensors, which are coupled to detect the second optical radiation propagating through the planar optical waveguide at the one or more respective angles of propagation.

In further embodiments, the device includes at least one emitter, which is coupled to emit the second optical radiation into the planar optical waveguide so that the radiation propagates in the waveguide as a guided wave and exits through at least one of the diffractive structures into the region in front of or behind the display. In a disclosed embodiment, the at least one emitter is located at an edge of the planar optical waveguide, outside an area of the display.

Additionally or alternatively, the device includes at least one sensor, which is coupled to receive the second optical radiation that has entered the planar optical waveguide from the region in front of or behind the display and propagated through the planar optical waveguide to the at least one sensor as a guided wave. In a disclosed embodiment, the at least one sensor is located at an edge of the planar optical waveguide, outside an area of the display.

There is also provided, in accordance with an embodiment of the invention, a method for guiding radiation, which includes providing a display configured to emit first optical radiation in a first wavelength band through a front surface of the display. A planar optical waveguide, which is transparent in the first wavelength band and is configured to guide second optical radiation in a second wavelength band along a direction transverse to the front surface, is overlaid on the display. One or more diffractive structures are formed in the planar optical waveguide so as to couple the guided second optical radiation between the planar optical waveguide and a region in front of or behind the display.

The present invention will be more fully understood from the following detailed description of the embodiments thereof, taken together with the drawings in which:

DETAILED DESCRIPTION OF EMBODIMENTS

Overview

Wearable and other sorts of portable consumer devices (referred to collectively as "portable devices" in the description), such as smartphones, augmented reality (AR) devices, virtual reality (VR) devices, and smart glasses comprise optical displays, and may also comprise sensor modules for sensing optical radiation. (The terms "optical rays," "optical radiation," and "light," as used in the present description and in the claims, refer generally to any and all of visible, infrared, and ultraviolet radiation.) The ongoing increase in the size of the display of these portable devices imposes strict limitations on the space available for various emitter and sensor modules within these devices.

Traditional sensing systems in portable devices comprise modules performing functions such as illumination, ambient light sensing, image capture, gesture recognition, and proximity sensing. Each type of module typically contains a lens assembly, as well as illumination and/or sensing devices that emit or receive optical radiation within different spectral regions through a variety of physical apertures located within the portable devices. These modules compete for space with the display (or displays) of the portable device, and may increase, for example, the physical size of a smartphone or the frame thickness of AR glasses.

The embodiments of the present invention that are described herein address these problems by providing a planar optical waveguide that is overlaid on the display of a portable device, which guides radiation across the surface of the display without interfering with the display functionality. The waveguide can be coupled to a functional module, such as an emission source, comprising one or more emitters, or a photodetection module, comprising one or more sensors (or both), which is typically located outside the display area, in order to guide radiation to or from the module.

In the disclosed embodiments, the display presents images by emitting optical radiation in a first wavelength band, typically in the visible range. The optical waveguide is transparent in this first wavelength band and permits the optical radiation emitted by the display to be transmitted through the waveguide, while guiding optical radiation in a second wavelength band by total internal reflection within the waveguide to and/or from the functional module. Diffractive structures in the waveguide couple the guided optical radiation in the second wavelength band between the waveguide and the region in front of or behind the display, for example by out-coupling or in-coupling certain fractions of the guided optical radiation in different directions. Thus, the waveguide couples the radiation in the second wavelength band between this region (either toward or away from the user) and the functional module, without significantly reducing the available display area and without interfering with the ability of a user of the device to view the images presented by the display.

In some embodiments, the first and second wavelength bands are disjoint. For example, the display may emit light in the visible spectrum (400-700 nm), while the waveguide operates in the infrared (IR) range (above 700 nm). Alternatively, the first and second wavelength bands may partially overlap, with the second wavelength band comprising at least some wavelengths within the visible spectrum. In either case, because the waveguide, including the diffractive structures, is transparent to the optical radiation emitted by the display, they can share the display area without any interference with the user's ability to observe the display.

In some embodiments, optical emitters and sensors, operating in the second wavelength band, are coupled to the waveguide, and are configured to emit optical radiation into the waveguide or to receive optical radiation from the waveguide. A functional module comprising the planar waveguide, diffractive structures, emitters, and/or sensors can perform one or more functions of the portable device, such as emitting flood and/or structured illumination, ambient light sensing (ALS), image sensing, three-dimensional (3D) mapping, motion sensing, and gesture recognition.

The diffractive structures in the waveguide may comprise, for example, surface-relief features, features with localized index gradients, features surrounded by media with dissimilar refractive indices, or form-birefringent Pancharatnam-Berry (geometric phase) liquid crystal molecules.

The diffractive structures may comprise any sorts of diffractive patterns that are known in the art, including one-dimensional or two-dimensional patterns of straight or curved lines, line segments with various lengths and angular orientations, and sub-wavelength circular or elliptically-shaped pillars, holes and tubes, as well as arbitrarily-shaped geometries. The diffractive structures may comprise localized regions with dissimilar patterns. The regions can be made contiguous, or can be separated from each other, in which case the unpatterned surface regions connecting the localized patterns reflect the guided light by total internal reflection without coupling the light out. The heights of the diffractive structures are in general smaller than the wavelengths of light from the display, so as to minimize their impact on the appearance of the display as seen by an observer. By adjusting the parameters of the diffractive structures, such as the size, shape, height, material, the fractional amount of light coupled out of the waveguide and/or into the waveguide, as well as the propagation direction, can be altered. In the present description and in the claims, the term "grating" is used interchangeably with the term "diffractive structure."

The structures may be formed using a variety of fabrication techniques, such as techniques based on material removal (optical or e-beam lithography followed by a surface etch), material modification (laser writing), or additive manufacturing (two-photon polymerization, nano-imprint).

Several waveguide layers may be integrated into a monolithic multi-layer assembly.

Embodiments of the present invention are described hereinbelow specifically with reference to the integration of waveguides and associated components with the display of a portable device, such as a smartphone. The principles of the present invention, however, may similarly be applied to enable emission and/or collection of optical radiation in conjunction with other sorts of displays, for illumination, sensing and other purposes.

System Description

Figure 1:
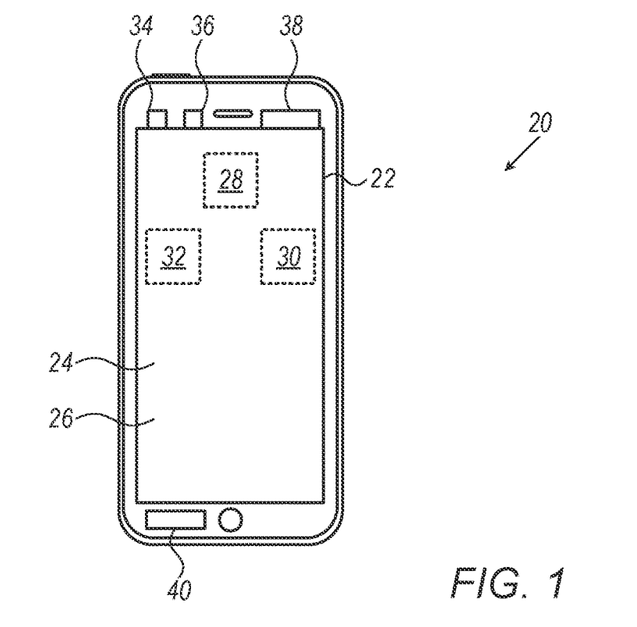
FIG. 1 is a schematic frontal view of a portable device with a display, in accordance with embodiments of the invention.

FIG. 1 is a schematic frontal view of a portable device 20, in accordance with an embodiment of the invention. Device 20 comprises a display 22, with a planar waveguide 24 overlaid on a front surface 26 of the display. Diffractive structures 28, 30, and 32 are formed in waveguide 24 in front of display 22. Optical radiation emitters 34 and 36 are formed in device 20 at the edge of waveguide 24, outside the area of display 22. An array of optical sensors 38 is formed in contact with waveguide 24, similarly outside the area of display 22. A controller 40 is coupled to display 22, to emitters 34 and 36, and to sensors 38. (For the sake of simplicity, the connections to and from the controller are not shown in FIG. 1.)

Display 22 emits optical radiation in a display wavelength band between wavelengths $\lambda_1$ and $\lambda_2$ through front surface 26 toward a region in front of the display. The display wavelength band typically comprises visible light, with $\lambda_1$=400 nm and $\lambda_2$=700 nm, but alternatively, the display may emit radiation over a narrower visible band, or even in the infrared or ultraviolet range in some applications.

Waveguide 24 is transparent in the display wavelength band, and is configured to guide second optical radiation in a guided wavelength band between wavelengths $\lambda_3$ and $\lambda_4$ along a direction transverse to front surface 26. In order to reduce interference by diffractive structures 28, 30, and 32 with the optical radiation emitted by display 22 (i.e., optical radiation in the display wavelength band ($\lambda_1 \ldots \lambda_2$)), the optical path difference introduced by the diffractive structures should be significantly smaller than the wavelengths within the band emitted by the display. In order to make the guided optical radiation invisible to an observer, the guided wavelength band may be limited to infrared or ultraviolet regions. Alternatively, the guided wavelength band may include visible wavelengths, for example wavelengths falling between the emission wavelengths of the pixels of display 22.

Optical radiation emitters 34 and 36, such as light-emitting diodes (LEDs) or laser diodes, emit radiation in the guided wavelength band ($\lambda_3 \ldots \lambda_4$) into waveguide 24, from whence the radiation is coupled out by respective diffractive structures 32 and 28. Optical radiation impinging from the region in front of device 20 onto diffractive structure 30, is coupled by the diffractive structure into waveguide 24, which in turn conveys the radiation to sensors 38.

Figure 2:
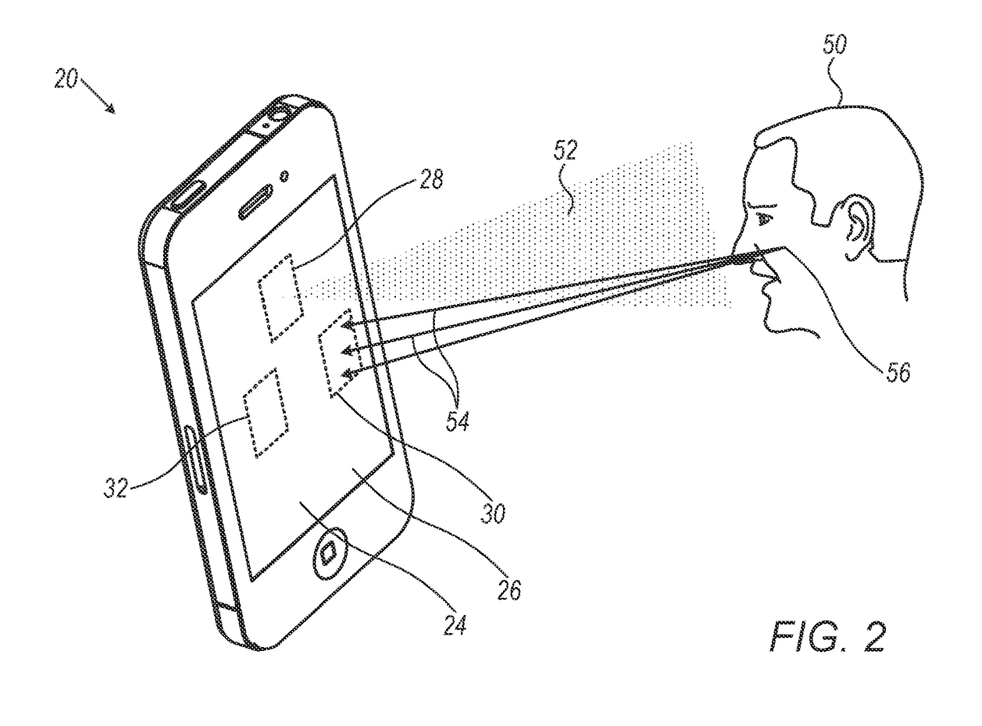
FIGS. 2 and 3 are schematic pictorial illustrations showing functions of the device of FIG. 1, in accordance with embodiments of the invention.
Figure 3:
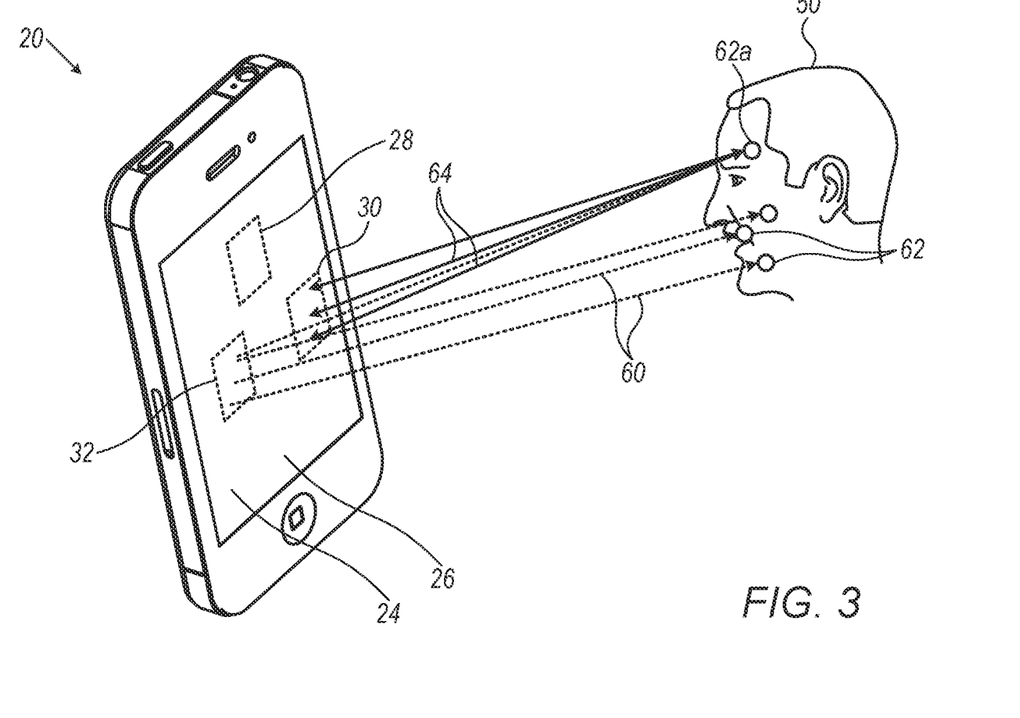

FIGS. 2 and 3 are schematic pictorial illustrations showing functions of device 20, in accordance with embodiments of the invention. Items that are identical to those in FIG. 1 are labelled with the same numerical labels.

In FIG. 2, device 20 takes a picture of a subject 50. Radiation emitted by emitter 36 (FIG. 1) is radiated out of waveguide 24 by diffractive structure 28 as flood illumination 52, illuminating subject 50. Illumination 52 is reflected and scattered by subject 50 back toward device 20 as rays 54, and impinges on diffractive structure 30. (For the sake of clarity, rays 54 are shown as emanating only from a single point 56, whereas in reality all illuminated points on subject 50 radiate similar rays.) Diffractive structure 30 couples rays 54 into waveguide 24, which conveys the rays to sensors 38 (FIG. 1). Controller 40 receives signals from sensors 38 responsively to rays 54, and by computational imaging reconstructs an image of subject 50.

In FIG. 3, device 20 captures a 3D map of subject 50. Radiation emitted by emitter 34 (FIG. 1) is radiated out of waveguide 24 by diffractive structure 30 as structured light, for example as discrete beams 60, projecting spots 62 onto subject 50. Beams 60 are reflected and scattered from spots 62 back toward device 20, as shown by rays 64 reflected and scattered from a spot 62a. As in FIG. 2, diffractive structure 30 couples rays 64 into waveguide 24, which conveys the rays to sensors 38. Controller 40 receives signals from sensors 38 responsively to rays 64, and by computational imaging reconstructs an image of each one of spots 62 on subject 50. Controller 40 finds the distance of each spot 62 from device 20 by triangulation, and thus constructs a 3D map of subject 50. By 3D mapping of, for example, a hand of subject 50 over several consecutive image frames, the movements of the hand in 3D space may be recorded for gesture recognition.

Alternatively, emitter 34 may emit beams 60 in the form of short pulses, and sensors 38, comprising single-photon avalanche diodes (SPADs), for example, may measure the time-of-flight (TOF) of the pulses for purposes of 3D mapping and gesture recognition.

In the present description, the surface of the display on which the waveguide is disposed is referred to for the sake of convenience as the front surface. The embodiments shown in FIGS. 1-3 relate to portable products such as smartphones, in which the display and the diffractive structures of the waveguide emit light through and receive light from the same side of the device, to and from the region in front of the display. In other devices, however, such as AR devices, the display may emit light toward the user, while the diffractive structures of the waveguide emit radiation to and receive radiation from the region behind the display, away from the user. In such embodiments of the present invention, the waveguide and the associated diffractive structures may thus be overlaid on the back surface of the display.

Illumination Modules

Figure 4:
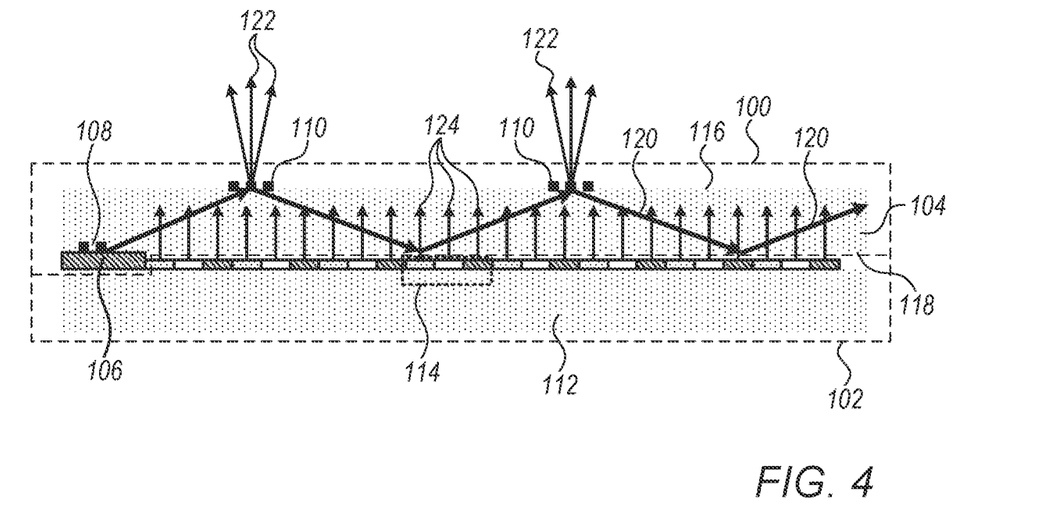
FIG. 4 is a schematic sectional view of an illumination module overlaid on a display, in accordance with an embodiment of the invention.

FIG. 4 is a schematic sectional view of an illumination module 100 overlaid on the front surface of a display 102, in accordance with an embodiment of the invention. Illumination module 100 comprises a waveguide 104, an emitter 106, an in-coupling grating 108, and out-coupling gratings 110. Display 102 comprises a display base 112 and groups of polychromatic (multi-wavelength) pixels 114.

Emitter 106 comprises an array of vertical-cavity surface-emitting lasers (VCSELs), emitting IR optical radiation, which is invisible to an observer viewing display 102. In-coupling grating 108 comprises, for example, alternating periodic parallel lines with varying refractive index. In-coupling grating 108 couples the IR radiation emitted by emitter 106 into waveguide 104 over a range of angles such that the coupled radiation propagates in the waveguide by total internal reflection (TIR) from top and bottom planar surfaces 116 and 118 of the waveguide, as shown by arrows 120.

Out-coupling gratings 110 are formed in top planar surface 116, and they interact with the radiation propagating in waveguide 104 by coupling a fraction of the radiation out of the waveguide through frustrated total internal reflection (FTIR), as shown by arrows 122. The directions of the IR radiation exiting waveguide 104 are based on local spacings and angular orientations of the sub-wavelength patterns of out-coupling gratings 110, as well as the directions of the guided waves, according to the laws of diffraction. While out-coupling gratings 110 are shown in FIG. 4 as localized regions along top surface 116, they can be expanded to cover the entire patterned area of the waveguide.

Each group of pixels 114 comprises emitters emitting optical radiation at different visible wavelengths. For example, a group 114 may comprise a red-emitting pixel, a green-emitting pixel, and a blue-emitting pixel, wherein the emission spectra of the pixels are respectively centered at 650 nm, 550 nm, and 450 nm. Alternatively, a group 114 may comprise different numbers of pixels emitting at different wavelengths. The radiation emitted by the pixels of each group 114, shown by arrows 124, traverses waveguide 104 substantially without interference by the waveguide, which is transparent to the visible radiation. Due to their low topography, even out-coupling gratings 110 have only an insignificant impact on the radiation emitted by pixels in groups 114.

Figure 5:
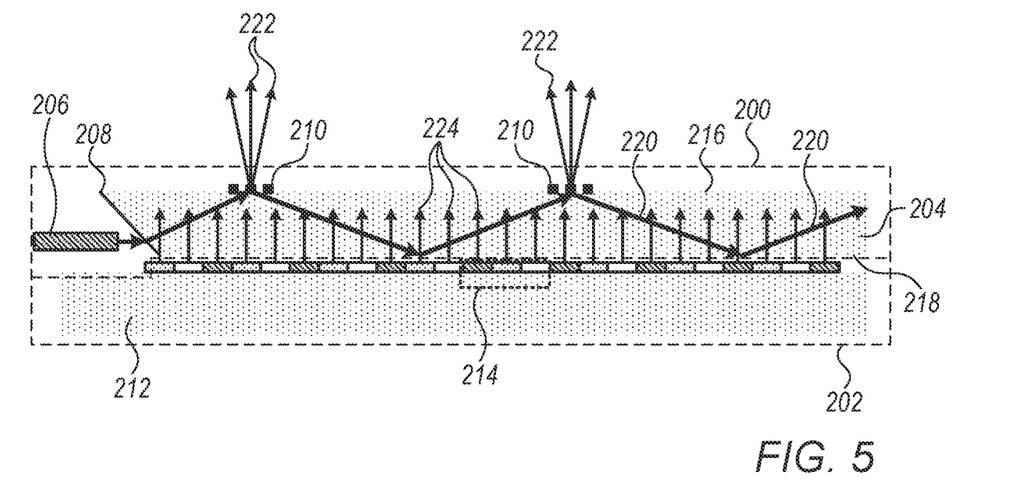
FIG. 5 is a schematic sectional view of an illumination module overlaid on a display, in accordance with another embodiment of the invention.

FIG. 5 is a schematic sectional view of an illumination module 200 overlaid on a display 202, in accordance with another embodiment of the invention. Illumination module 200 comprises a waveguide 204, an emitter 206, an in-coupling face 208, and out-coupling gratings 210. Display 202 comprises a display base 212 and groups of polychromatic pixels 214.

Emitter 206 comprises an edge-emitting laser, emitting IR optical radiation. In-coupling face 208 is a planar surface, which is angled in order to couple the IR radiation emitted by emitter 206 into waveguide 204 over a range of angles such that the coupled radiation propagates in the waveguide by TIR from top and bottom planar surfaces 216 and 218 of the waveguide, as shown by arrows 220. The radiation emitted by emitter 206 may be shaped by micro-optics (not shown), prior to coupling into waveguide 204, into a beam that is narrow in the direction perpendicular to surfaces 216 and 218, but wide along in a transverse direction.

Similarly to module 100 (FIG. 4), the IR radiation propagating in waveguide 204 through TIR is coupled out by out-coupling gratings 210, as shown by arrows 222. Display 202 emits, similarly to display 102 (FIG. 4) visible radiation, which is transmitted through module 200, as shown by arrows 224, without significant interference.

In order to minimize the impact of out-coupling gratings 110 (FIG. 4) and 210 (FIG. 5) on the visible light emitted by displays 102 and 202, the heights of the out-coupling gratings are chosen to be substantially smaller than the shortest wavelength of the visible light (400 nm). For example, out-coupling gratings that are between 50 and 100 nm high with appropriate spacing between the grating lines will couple out a sufficient portion of the guided IR radiation from the waveguide, while transmitting between 85% and 97% of the visible light emitted by the display, depending on the wavelength and the polarization of the visible light.

The grating heights may be tailored for different display pixels in order to further minimize the influence of the gratings onto the transmitted visible light. For example, as visible light at the blue end of the spectrum exhibits a lower transmittance (higher diffraction) through the gratings than light at longer wavelengths, the heights of the gratings above the pixels emitting blue light may be further reduced, or the gratings above these pixels may be completely eliminated.

Sensing Modules

Figure 6:
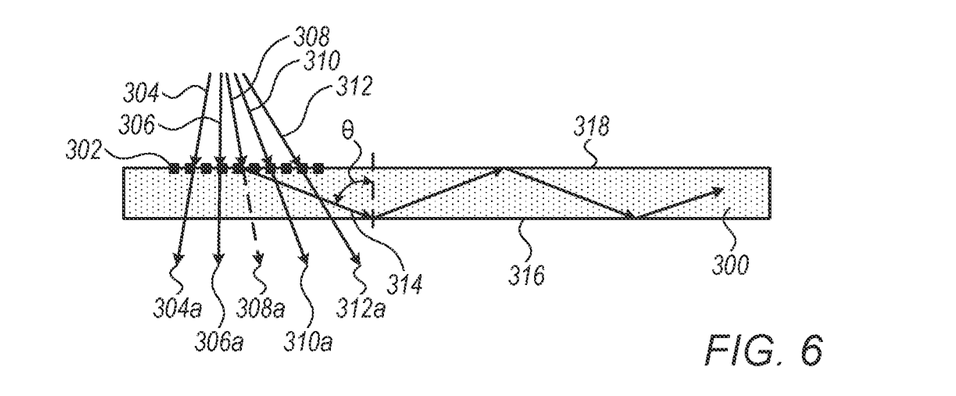
FIG. 6 is a schematic sectional view of a waveguide comprising an angularly-selective diffractive-transmissive grating, in accordance with an embodiment of the invention.

FIG. 6 is a schematic sectional view of a waveguide 300 comprising an angularly-selective diffractive-transmissive grating 302, in accordance with an embodiment of the invention. The grating is "angularly selective" in the sense that it preferentially diffracts radiation in a particular angular range, while having insignificant effect on angles outside this range. Waveguide 300, together with grating 302, comprise a part of a receiving sensing module, which is overlaid on a display (not shown in this figure) in a similar manner to the overlay of illumination module 100 on display 102 (FIG. 4).

Monochromatic light at a wavelength Λ impinges on grating 302 at several angles of incidence, as shown by arrows 304, 306, 308, 310, and 312. While the light from most of the incident directions will propagate through grating 302 (as shown by arrows 304*a*, 306*a*, 310*a*, and 312*a*) without being substantially affected, a significant fraction of light from a direction designated by arrow 308 (or a small cone of angles around that direction) will be strongly diffracted, as shown by an arrow 314. The spatial frequency of grating 302 is chosen so that the diffracted light impinges on a bottom surface 316 of waveguide 300 at an angle of incidence θ that exceeds the critical angle of the waveguide. Thus, the diffracted light propagates by TIR as a guided wave between the bottom surface and a top surface 318 of waveguide 300. The undiffracted part of the light from the direction indicated by arrow 308 propagates through waveguide 300 at reduced power, as indicated by a dotted arrow 308*a*.

The guided wave propagating in waveguide 300 may impinge on a sensor or array of sensors (such as sensors 38 in FIG. 1), for example for sensing and mapping objects, as illustrated in FIGS. 2-3, or for sensing ambient light, as detailed in FIGS. 11, 12 and 13*a*-13*b*, below. This sort of angularly-selective grating and waveguide is particularly suited for directionally-selective sensing applications. Multiple gratings, with different respective acceptance angles, may be formed on the same waveguide or on different waveguides in order to collect light from different angular ranges and to direct the light in each range to a different, respective sensor. Controller 40 (FIG. 1) may then combine the directional sensor signals in order to reconstruct a 2D image or 3D map of the region from which the light is received.

Figure 7:
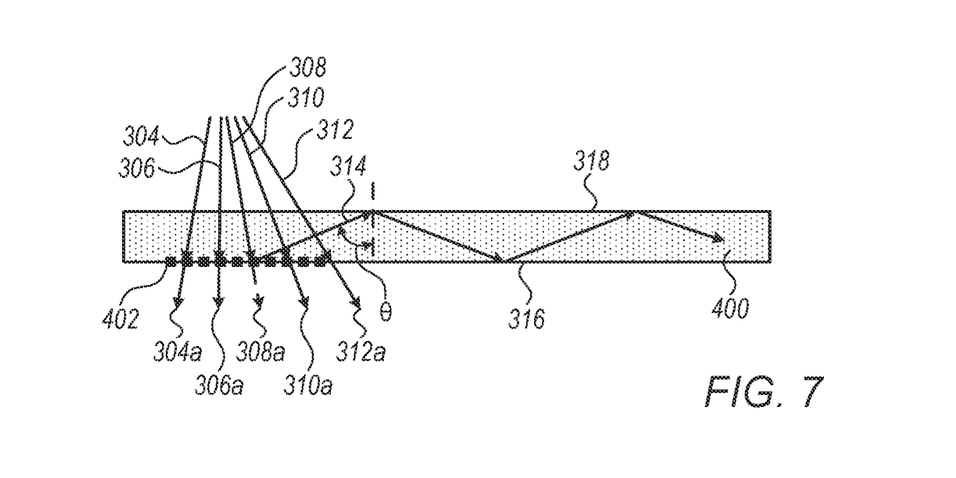
FIG. 7 is a schematic sectional view of a waveguide comprising an angularly-selective diffractive-reflective grating, in accordance with another embodiment of the invention.

FIG. 7 is a schematic sectional view of a waveguide 400 comprising an angularly-selective diffractive-reflective grating 402, in accordance with another embodiment of the invention. With the exception of diffractive-reflective grating 402, which replaces the function of diffractive-transmissive grating 302 of FIG. 6, the same labels are used in FIG. 7 as in FIG. 6. The light entering from the direction denoted by arrow 308 is diffracted by grating 402 into waveguide 400, but now by reflection rather than by transmission. Thus, a part of light impinging on waveguide 400 is coupled into the waveguide. As in the embodiment of FIG. 6, the in-coupling may be angularly selective.

Figure 8:
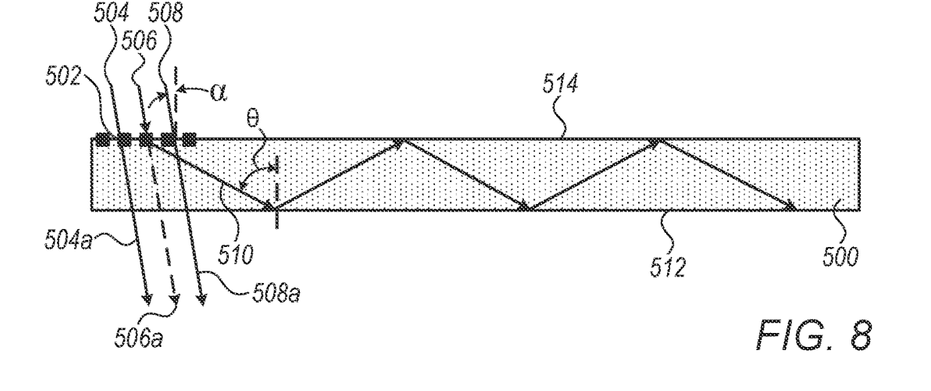
FIG. 8 is a schematic sectional view of a waveguide comprising a spectrally-selective diffractive-transmissive grating, in accordance with yet another embodiment of the invention.

FIG. 8 is a schematic sectional view of a waveguide 500 comprising a spectrally-selective diffractive-transmissive grating 502, in accordance with yet another embodiment of the invention. The grating is "spectrally selective" in the sense that it preferentially diffracts radiation in a particular wavelength band, while having insignificant effect on wavelengths outside this band. Polychromatic light impinges on grating 502 with an angle of incidence α for all wavelengths. Arrows 504, 506, and 508 represent light at three different wavelengths. For example, arrow 504 may denote blue light, arrow 506 may denote green light, and arrow 508 may denote red light. (Here the terms "blue," "green," and "red" are used to denote specific wavelengths, for example 450 nm, 550 nm, and 650 nm, respectively. Alternatively, these terms may denote spectral bands around certain center wavelengths.)

Grating 502 in this embodiment is configured so that only green light is diffracted by the grating, whereas the other wavelengths are transmitted through the grating without hindrance, as represented by arrows 504a and 508a. The green light that is diffracted by grating 502, shown by an arrow 510, impinges on a bottom planar surface 512 of waveguide 500 at an angle θ, which exceeds the critical angle inside the waveguide. Thus, as in the embodiments of FIGS. 6-7, the light diffracted into waveguide 500 will propagate between bottom surface 512 and a top surface 514 as a guided wave by TIR, and may be subsequently intercepted by a sensor, such as sensors 38 in FIG. 1. A small fraction of the green light (arrow 506) is transmitted by grating 502, exiting waveguide 500 as an arrow 506a.

Rather than spectrally-selective diffractive-transmissive grating 502, a spectrally-selective diffractive-reflective grating may be employed, similarly to the embodiment shown in FIG. 7, for coupling light into waveguide 500.

This sort of spectrally-selective grating can be used in spectrally-selective sensing applications. Multiple gratings, with different spectral bands, may be formed on the same waveguide or on different waveguides in order to collect light in different wavelength ranges and to direct the light in each range to a different, respective sensor. Controller 40 (FIG. 1) may then combine the directional sensor signals in order to extract spectral information with respect to the region from which the light is received. An array of gratings that are both angularly and spectrally selective can be used in capturing and reconstructing a color image.

Figure 9:
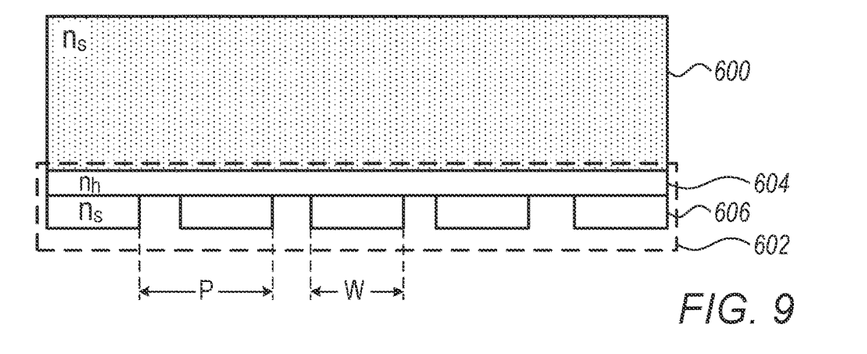
FIG. 9 is a schematic sectional view of a waveguide with a spectrally and angularly selective diffractive-reflective grating, in accordance with an embodiment of the invention.
Figure 12:
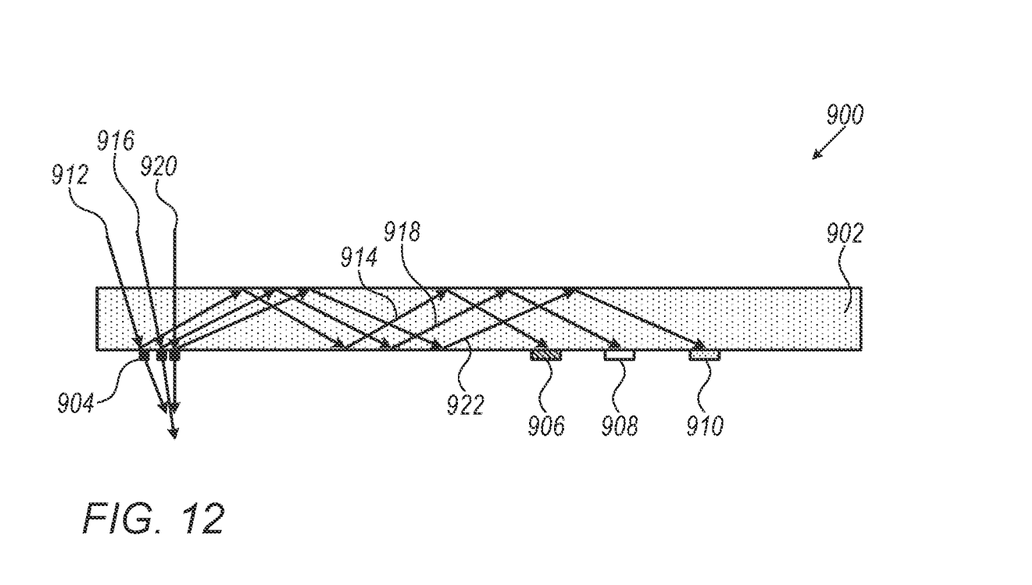
FIG. 12 is a schematic sectional view of a receiving sensing module configured for multi-band spectral sensing of ambient light, in accordance with an embodiment of the invention.

FIG. 9 is a schematic sectional view of a waveguide 600 with a spectrally and angularly selective diffractive-reflective grating 602, in accordance with an embodiment of the invention. Grating 602 may be used in implementing the functionality of grating 402 (FIG. 7), or grating 904 (FIG. 12, below).

Grating 602 comprises a uniform layer 604 and a patterned layer 606. Only the area of waveguide 600 facing grating 602 is shown in FIG. 9. The dimensions and the refractive indices of waveguide 600 and grating 602 are given in Table 1, below.

TABLE 1

DIMENSIONS AND REFRACTIVE INDICES OF WAVEGUIDE 600 AND GRATING 602

| | material | refractive index at 940 nm | thickness (μm) | period P (nm) | mesa width W (nm) |
|---|---|---|---|---|---|
| waveguide 600 | fused silica | 1.45 | 10-1000 | — | — |
| uniform layer 604 | Si$_3$N$_4$ | 2.15 | 0.131 | — | — |
| patterned layer 606 | SiO$_2$ | 1.45 | 0.098 | 341 | 289 |

The inventors have calculated that grating 602 diffracts 53.3% of light at the wavelength of 500 nm into the $-1^{st}$ diffractive order in reflection, when the angle of incidence into uniform layer 604 is 10°. The $-1^{st}$ order is diffracted at an angle of −56.1°, which exceeds the critical angle of 43.6° of waveguide 600, resulting in propagation of the diffracted and reflected light as a guided wave within the waveguide.

Figure 10:
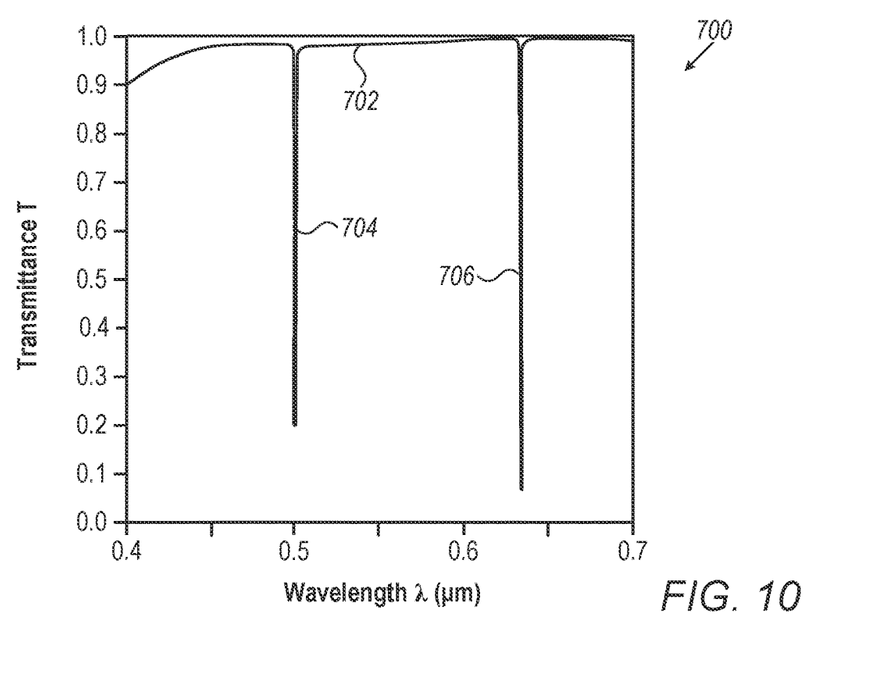
FIG. 10 is a plot of a calculated spectral transmittance of the grating of FIG. 9, in accordance with an embodiment of the invention.

FIG. 10 is a plot 700 of a calculated spectral transmittance of grating 602 (FIG. 9), in accordance with an embodiment of the invention. A curve 702 shows the transmittance T (vertical axis) of grating 602 as a function of wavelength Λ from 400 nm to 700 nm (horizontal axis) at an angle of incidence of 10°. The transmittance exceeds 0.9 (90%) across the entire spectral range of the plot, with the exception of two narrow notches 704 and 706. Notch 704 at a wavelength of 500 nm represents reflections into the $-1^{st}$ diffraction order (53.9%) and into the $0^{th}$ order (26.3%, specular reflection), and notch 706 at 635 nm represents reflections into the $0^{th}$ order (93.5%, specular reflection.) Due to their narrow spectral width, the impact of notches 704 and 706 on the light received by an observer from a display under grating 602 is minimal.

Varying the angle of incidence onto grating 602 will change the locations of notches 704 and 706 with respect to the horizontal (wavelength) axis, but the notches remain narrow, and will not impact the visual perception of an underlying display.

Figure 11:
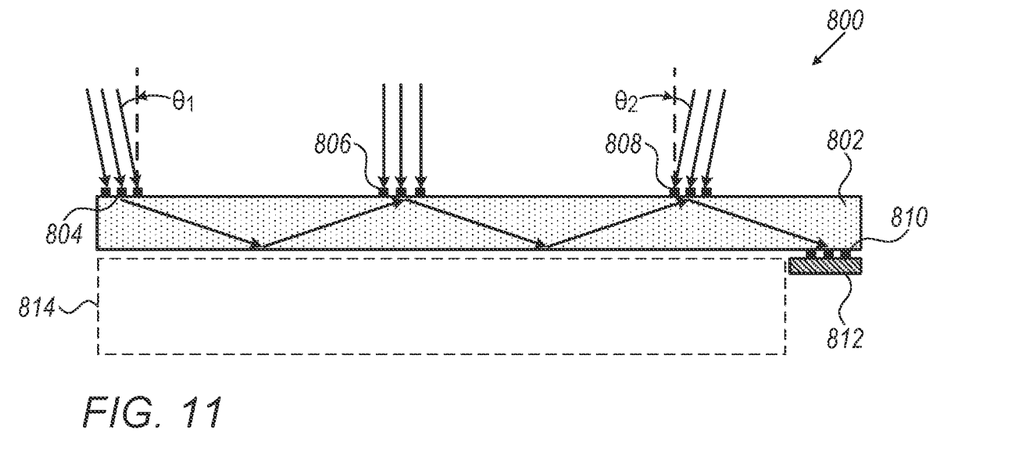
FIG. 11 is a schematic sectional view of a receiving sensing module configured to sense ambient light (ALS), in accordance with an embodiment of the invention.

FIG. 11 is a schematic sectional view of a sensing module 800 configured to sense ambient light (ALS), in accordance with an embodiment of the invention. Sensing module 800 comprises a waveguide 802, in-coupling gratings 804, 806, and 808, an out-coupling grating 810, and a sensor 812.

In-coupling gratings 804, 806, and 808 are similar to grating 502 (FIG. 8), in that each of them couples light into waveguide 802 from a specific direction at a specific wavelength. Each grating couples light in from a different angle. For example, grating 804 couples light in from an angle 81, grating 806 couples light in from an angle normal to the plane of waveguide 802, and grating 808 couples light in from an angle 82. Configuring gratings 804, 806, and 808 to couple light in from different angles extends the angular range of the sensed ambient light. Alternatively, different numbers of gratings, such as two, four, five, or more, may be used to receive light from different numbers of angles and different spectral ranges.

The light coupled into waveguide 802 by gratings 804, 806, and 808 is guided within the waveguide to out-coupling grating 810, which diffracts the guided light into sensor 812. Sensor 812 comprises a photodetector, such as a photodiode or a single-photon avalanche diode (SPAD), which emits a signal in response to the light received through grating 810. Sensor 812 may be located outside the area of a display 814 on which waveguide 802 is overlaid, so as not to interfere with the display.

FIG. 12 is a schematic sectional view of a sensing module 900 configured for multi-band spectral sensing of ambient light (ALS), in accordance with another embodiment of the invention.

Sensing module 900 comprises a waveguide 902, a spectrally and angularly sensitive diffractive-reflective grating 904, and sensors 906, 908, and 910. Grating 904 is both angularly and spectrally selective in that it reflects a given wavelength impinging only from a specific direction. For example, blue light arriving from a direction 912 is diffracted and reflected into waveguide 902 as guided light shown by an arrow 914. Similarly, green light arriving from a direction 916 is coupled into guided light shown by an arrow 918, and red light arriving from a direction 920 is coupled into guided light shown by an arrow 922. The different angles of propagation within waveguide 902 cause the different wavelengths to be further spatially separated. Sensors 906, 908, and 910 are positioned so that each sensor receives a different wavelength: Sensor 906 receives blue light (arrow 914), sensor 908 receives green light (arrow 918), and sensor 910 receives red light (922). As in FIG. 11, sensors 906, 908, and 910 may be located outside the display area.

Thus a single grating 904 separates the spectral bands and redirects them onto different photosensitive areas through a waveguiding process, thus enabling characterization of the spectral distribution of the received ambient light.

Figure 13A:
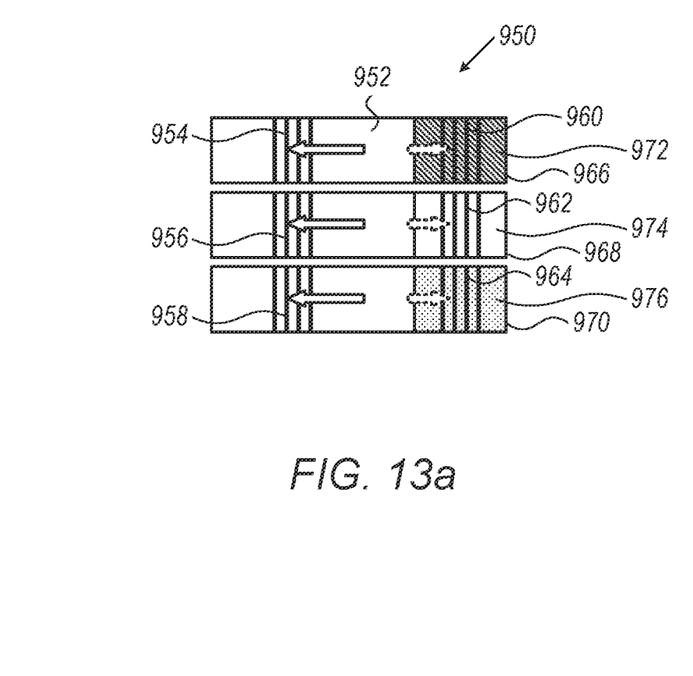
FIGS. 13a and 13b are a schematic top view and a schematic sectional view, respectively, of a three-band receiving spectral sensing module, in accordance with an embodiment of the invention.
Figure 13B:
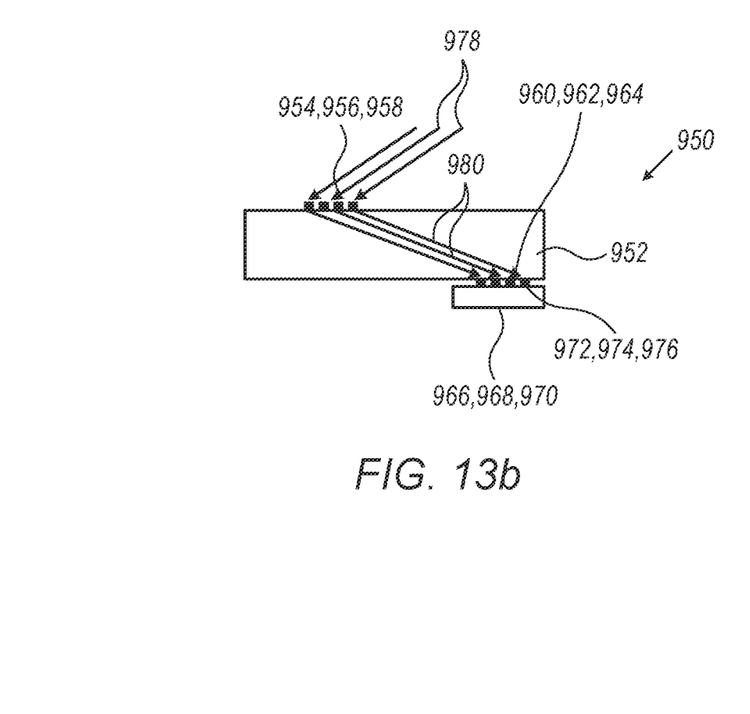

FIGS. 13a and 13b are a schematic top view and a schematic sectional view, respectively, of a three-band spectral sensing module 950, in accordance with an embodiment of the invention. Sensing module 950 comprises a waveguide 952, in-coupling transmission gratings 954, 956, and 958, out-coupling transmission gratings 960, 962, and 964, sensors 966, 968, 970, and optional spectral filters 972, 974, and 976.

Gratings 954, 956, and 958 are sub-wavelength transmission gratings, which diffract light impinging at a high angle of incidence into the $-1^{st}$ diffracted order with an almost 100% diffraction efficiency. The diffraction is schematically shown in FIG. 13b, wherein arrows 978 denote the impinging light and arrows 980 denote the $-1^{st}$ order diffraction. The diffraction angle is sufficiently high so that the diffracted light propagates as a guided wave in waveguide 952. As projected into the plane of waveguide 952, the direction of propagation of the diffracted light (arrows 980) is opposite to the direction of the impinging light (arrows 978). (For simplicity, the back-and-forth reflections in waveguide 952 have been omitted in FIG. 13b.) Each of gratings 954, 956, and 958 further exhibits a wavelength-dependent diffraction efficiency, so that discrete spectral bands are coupled in by each grating. For example, grating 954 has peak coupling in blue light, grating 956 has peak coupling in green light, and grating 958 has peak coupling in red light. The three wavelengths of the in-coupled light propagate within waveguide 952 to out-coupling gratings 960, 962, and 964, which couple the light into respective sensors 966, 968, and 970. Optional spectral filters 972, 974, and 976 may be overlaid on the sensors for additional spectral separation.

In the present example, gratings 954, 956, and 958 are etched into a fused silica substrate. The dimensions and calculated performance at the design wavelength of each grating are given for their specific wavelengths in Table 2, below. Each grating has a grating period P, step height h, and mesa width W (mesas denoting the protruding areas of a grating). The gratings are designed for an angle of incidence of 66°, and for TE-polarized light.

TABLE 2

PROPERTIES OF GRATINGS 954, 956, AND 958

| Grating | Design wavelength (nm) | Period P (nm) | Height h (nm) | Width W (nm) | Diffraction efficiency to $-1^{st}$ order (%) | Reflectivity (%) |
|---|---|---|---|---|---|---|
| 954 | 420 | 216 | 311 | 95 | 99.89 | 0.09 |
| 956 | 500 | 257 | 369 | 113 | 99.89 | 0.06 |
| 958 | 600 | 308 | 446 | 134 | 99.88 | 0.07 |

The transmittance of the gratings for low angles of incidence does not exhibit diffraction, i.e. light propagates same as though a planar interface, and exceeds 95% transmission across the entire visible spectrum. Diffraction effects emerge at larger angles (about 30 deg. incident angle for 500 nm wavelength), and will gradually increase, reaching its peak efficiency of 99.89% at 66 deg. The gratings have a high coupling efficiency into the waveguide at large angles of incidence, and a low impact on the radiation emitted by a display underneath the waveguide at the typical viewing angles. Thus, the impact of the gratings on the displayed image is minimal.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optoelectronic device, comprising:
   a display comprising:
     a display base; and
     groups of pixels, which are disposed on the display base and configured to emit first optical radiation in a first wavelength band through a front surface of the display;
   a planar optical waveguide, which is transparent in the first wavelength band and is overlaid across the display base, and which is configured to guide second optical radiation in a second wavelength band along a direction transverse to the front surface;
   at least one emitter, which is configured to emit a beam of the second optical radiation into the planar optical waveguide;
   a first diffractive structure formed in a first area of the planar optical waveguide so as to couple the beam of the second optical radiation that is guided through the planar optical waveguide out of the planar optical waveguide into a region in front of the display;
   a second diffractive structure formed in a second area of the planar optical waveguide so as to couple incoming second optical radiation from the region in front of the display into the planar optical waveguide, whereby the incoming second optical radiation is guided through the planar optical waveguide; and
   at least one sensor, which is coupled to receive and sense the incoming second optical radiation that has been guided through the planar optical waveguide.

2. The optoelectronic device according to claim 1, wherein the first wavelength band is a visible band, while the second wavelength band is an infrared band.

3. The optoelectronic device according to claim 1, wherein the planar optical waveguide has a bottom surface in contact with the display and a top surface opposite the bottom surface, and wherein at least one of the one or more diffractive structures is formed in the top surface of the planar optical waveguide.

4. The optoelectronic device according to claim 1, wherein the planar optical waveguide has a bottom surface in contact with the display and a top surface opposite the bottom surface, and wherein at least one of the one or more diffractive structures is formed in the bottom surface of the planar optical waveguide.

5. The optoelectronic device according to claim 1, wherein the one or more diffractive structures have heights that are smaller than a shortest wavelength in the first wavelength band.

6. The optoelectronic device according to claim 1, wherein the one or more diffractive structures are spectrally selective, so as to preferentially diffract the second optical radiation in the second wavelength band.

7. The optoelectronic device according to claim 6, wherein the one or more diffractive structures are configured to diffract the second optical radiation at different first and second wavelengths in the second wavelength band so as to propagate in the planar optical waveguide at different, respective first and second angles of propagation.

8. The optoelectronic device according to claim 7, and wherein the at least one sensor comprises first and second sensors, which are coupled to detect the second optical radiation propagating through the planar optical waveguide at the first and second wavelengths, respectively.

9. The optoelectronic device according to claim 1, wherein the one or more diffractive structures are angularly selective, so as to preferentially diffract the second optical radiation that is incident on the one or more diffractive structures in a selected angular range.

10. The optoelectronic device according to claim 9, wherein the one or more diffractive structures are configured to diffract the second optical radiation propagating in different first and second directions in the region in front of or behind the display so as to propagate in the planar optical waveguide at one or more respective angles of propagation.

11. The optoelectronic device according to claim 10, wherein the at least one sensor is coupled to detect the second optical radiation propagating through the planar optical waveguide at the one or more respective angles of propagation.

12. The optoelectronic device according to claim 1, wherein the at least one emitter is located at an edge of the planar optical waveguide, outside an area of the display.

13. The optoelectronic device according to claim 1, wherein the at least one sensor is located at an edge of the planar optical waveguide, outside an area of the display.

14. A method for guiding radiation, comprising:
providing a display comprising a display base and groups of pixels comprising emitters, which are disposed on the display base and configured to emit first optical radiation in a first wavelength band through a front surface of the display;
overlaying on the display a planar optical waveguide, which is transparent in the first wavelength band and is configured to guide second optical radiation in a second wavelength band along a direction transverse to the front surface;
coupling at least one emitter to emit a beam of the second optical radiation into the planar optical waveguide;
forming a first diffractive structure in a first area of the planar optical waveguide so as to couple the beam of the second optical radiation that is guided through the planar optical waveguide out of the planar optical waveguide into a region in front of the display;
forming a second diffractive structure in a second area of the planar optical waveguide so as to couple incoming second optical radiation from the region in front of the display into the planar optical waveguide, whereby the incoming second optical radiation is guided through the planar optical waveguide; and
coupling at least one sensor to receive and sense the incoming second optical radiation that has been guided through the planar optical waveguide.

15. The method according to claim 14, wherein the one or more diffractive structures are spectrally selective, so as to preferentially diffract the second optical radiation in the second wavelength band.

16. The method according to claim 14, wherein the one or more diffractive structures are angularly selective, so as to preferentially diffract the second optical radiation that is incident on the one or more diffractive structures in a selected angular range.

* * * * *